(12) United States Patent
Chamberlin

(10) Patent No.: US 10,874,116 B2
(45) Date of Patent: Dec. 29, 2020

(54) FORTIFIED JELLY CONFECTIONERY

(71) Applicant: BASF Corporation, Tarrytown, NY (US)

(72) Inventor: Natasha Noel Chamberlin, Nanuet, NY (US)

(73) Assignee: BASF SE, Ludwigshafen am Rhein (DE)

(*) Notice: Subject to any disclaimer, the term of this patent is extended or adjusted under 35 U.S.C. 154(b) by 240 days.

(21) Appl. No.: 15/570,184

(22) PCT Filed: Apr. 28, 2016

(86) PCT No.: PCT/US2016/029681
§ 371 (c)(1),
(2) Date: Oct. 27, 2017

(87) PCT Pub. No.: WO2016/176398
PCT Pub. Date: Nov. 3, 2016

(65) Prior Publication Data
US 2018/0116245 A1    May 3, 2018

Related U.S. Application Data

(60) Provisional application No. 62/154,795, filed on Apr. 30, 2015.

(51) Int. Cl.
| A23G 3/42 | (2006.01) |
| A23G 3/40 | (2006.01) |
| A23L 29/231 | (2016.01) |
| A23G 3/36 | (2006.01) |
| A23L 21/00 | (2016.01) |
| A23L 21/10 | (2016.01) |

(52) U.S. Cl.
CPC ............ *A23G 3/42* (2013.01); *A23G 3/36* (2013.01); *A23G 3/364* (2013.01); *A23G 3/40* (2013.01); *A23L 21/00* (2016.08); *A23L 21/10* (2016.08); *A23L 29/231* (2016.08); *A23V 2002/00* (2013.01); *A23V 2200/222* (2013.01); *A23V 2200/228* (2013.01); *A23V 2250/5072* (2013.01)

(58) Field of Classification Search
CPC . A23G 3/36; A23G 3/364; A23G 3/40; A23G 3/42; A23L 29/20; A23L 29/231
USPC ........................................................ 426/660
See application file for complete search history.

(56) References Cited

U.S. PATENT DOCUMENTS

| 3,567,469 A † | 3/1971 | Calderone-Pedroza |
| 4,601,907 A | 7/1986 | Knebl et al. |
| 4,672,034 A | 6/1987 | Rombouts et al. |
| 4,853,236 A | 8/1989 | Langler |
| 5,158,800 A | 10/1992 | Bell |
| 5,900,268 A | 5/1999 | Mazoyer et al. |
| 6,391,370 B1 | 5/2002 | Rogers et al. |
| 6,444,242 B1 † | 9/2002 | Skelbaek |
| 6,673,380 B2 | 1/2004 | Yang et al. |
| 7,632,532 B2 | 12/2009 | McKee et al. |
| 7,767,248 B2 | 8/2010 | Overly, III et al. |
| 8,435,581 B2 † | 5/2013 | Fang |
| 8,524,303 B2 | 9/2013 | Prakash et al. |
| 9,131,720 B2 | 9/2015 | Prakash et al. |
| 9,629,378 B2 | 4/2017 | Harting Glade et al. |
| 2002/0064548 A1 | 5/2002 | Yoon et al. |
| 2002/0197357 A1 | 12/2002 | Pfeiffer |
| 2005/0054621 A1 | 3/2005 | Gako-Golan et al. |
| 2007/0042102 A1 | 2/2007 | Furcich |
| 2007/0110844 A1 | 5/2007 | Kubantseva et al. |
| 2007/0141198 A1 | 6/2007 | Yang |
| 2008/0063747 A1 | 3/2008 | Boghani et al. |
| 2008/0255938 A1 | 10/2008 | Jani et al. |
| 2009/0047355 A1 | 2/2009 | Auweter et al. |
| 2009/0110799 A1 † | 4/2009 | Funami |
| 2009/0150231 A1 | 6/2009 | Jani et al. |
| 2010/0104722 A1 | 4/2010 | Francisca et al. |
| 2011/0129563 A1 | 6/2011 | Ashokan et al. |
| 2011/0165290 A1 | 7/2011 | Ashokan et al. |
| 2011/0313055 A1 | 12/2011 | Ervin et al. |
| 2013/0309291 A1 | 11/2013 | Stoll |
| 2016/0324207 A1 | 11/2016 | Briganti et al. |

FOREIGN PATENT DOCUMENTS

| EP | 1929881 A1 † | 6/2008 |
| EP | 2796056 A1 | 10/2014 |
| GB | 486463 A † | 6/1938 |
| GB | 489970 A † | 8/1938 |

(Continued)

OTHER PUBLICATIONS

International Search report dated Aug. 9, 2016 in International Application No. PCT/US2016/029681.
International Preliminary Report on Patentability and Written Opinion dated Oct. 31, 2017 in International Application No. PCT/US2016/029681.

(Continued)

*Primary Examiner* — Jyoti Chawla
(74) *Attorney, Agent, or Firm* — DLA Piper LLP (US)

(57) ABSTRACT

The present application relates to the field of confectionery jellies fortified with high concentrations of hydrophobic actives such as phytosterol esters, omega-3 fatty acids (i.e. combinations of DHA and EPA) and/or conjugated linoleic acid (CLA). The ingestible hydrophobic actives are incorporated at high levels by using two types of pectin; an emulsifying pectin and a gelling pectin, wherein the weight ratio of the hydrophobic active to emulsifying pectin ranges from about 5:1 to about 35:1.

16 Claims, No Drawings

(56) References Cited

FOREIGN PATENT DOCUMENTS

| | | | |
|---|---|---|---|
| GB | 490001 A † | 8/1938 | |
| WO | 9501101 A1 † | 1/1995 | |
| WO | 9902047 A1 † | 1/1999 | |
| WO | WO-2003/064444 A1 | 8/2003 | |
| WO | WO-2007/022317 A2 | 2/2007 | |
| WO | WO-2010/149759 A1 | 12/2010 | |
| WO | 2011128631 A2 † | 10/2011 | |
| WO | WO-2013007493 A1 * | 1/2013 | ............... A23G 9/38 |

T. Turquois, et al. Extraction of highly gelling pectin substances from sugar beet pulp and potato pulp: influence of extrinsic parameters on their gelling properties. Food Hydrocolloids 13 (1999) pp. 255-262.†

\* cited by examiner
† cited by third party

# FORTIFIED JELLY CONFECTIONERY

CROSS REFERENCE TO RELATED APPLICATIONS

This application is a National Stage Application under 35 U.S.C. § 371 of International Application No. PCT/US2016/029681 filed Apr. 28, 2016, which claims the benefit pursuant to 35 U.S.C. § 119(e) of U.S. Provisional Application No. 62/154,795 filed Apr. 30, 2015, both of which are herein incorporated by reference in their entirety.

FIELD OF THE INVENTION

The present invention relates generally to the field of confectionery jellies fortified with high concentrations of hydrophobic actives such as phytosterol esters, omega-3 fatty acids (ie. combinations of DHA and EPA) and/or conjugated linoleic acid (CLA).

BACKGROUND OF THE INVENTION

Nutraceuticals, pharmaceuticals, and supplements, such as essential fatty acids, including omega-3 fatty acids, omega-6 fatty acids, conjugated fatty acids, and other fatty acids; phytochemicals, including phytosterols; other oils; and coenzymes, including Coenzyme Q10, oil soluble vitamins such as vitamin A, E and D and other oil-based additives are desirable food additives for human consumption. However, these are considered non-polar compounds. While these non-polar compounds are relatively easy to formulate in a gelatin based confectionery, gelatin free, or substantially gelatin free confectioneries are much more difficult to formulate comprising these non-polar supplements.

Gelatin based products normally give high clarity and springy elastic texture. But gelatin based formulations are problematic in that they are considered non-vegetarian/non-kosher, remelt at temperatures above 35° C., causing issues in warmer climates and the potential to fuse back together into a melted mass within the packaging. Additionally, gelatin based candies are relatively hard and because of this hardness characteristic are not easily consumed in significant amounts which may be required when large quantities of the oil based nutraceuticals, pharmaceuticals and supplements are desired in a single serving. Thus the gelatin based products are not easily chewable in significant amounts.

Further complicating the difficulties of formulating and fortifying jelly products is that non-polar fortifying additives have their own particular, frequently undesirable taste properties. Because of their non-polar nature, they also have a tendency to agglomerate and disperse unevenly in a polar matrix.

To obtain more accurate dose levels within the jellied carbohydrate, uniformity of ingredients in the jellied product is preferred.

It is a further object of the present invention to provide gellable carbohydrate products having improved organoleptic properties and texture properties.

It is a further object to provide gellable carbohydrate confectioneries that are essentially gelatin free.

By gelatin free it is meant that the composition of the jellied confectionery comprises less than 5 wt. % gelatin, for example less than about 2 or about 1 wt % gelatin. It is most typical that the jellied confectionery will be gelatin free, that is, the confectionery product contains no significant amount of gelatin, i.e. less than 0.1, 0.01 or 0.001 wt. % gelatin based on the total weight of the jellied confectionery product.

Still another object of the present invention is to provide gelled or jellied food products, particularly those that are fruit bearing that are fortified to high levels with the hydrophobic ingestible actives that nonetheless exhibit good flavor and texture both initially and over extended storage at room temperatures.

Thus it would be desirable to provide a gelled or jelly food product fortified with any one or mixtures of the above ingestible hydrophobic active, particularly those wherein the gel structuring agent is pectin. The present invention satisfies this need by providing methods for preparing such gelled or jelly products that are so fortified. The present invention further embodies a jellied confectionery or carbohydrate that includes relatively high amounts of the ingestible hydrophobic active or actives.

SUMMARY OF THE INVENTION

The present inventors have found that hydrophobic ingestible substances such as nutraceuticals, prebiotics, herb extracts, plant extracts, such as phytosterols, such as stigmasterol, campesterol and b-sitosterol, corresponding stanols and esters thereof, fish oils such as omega 3 fatty acids such as docosahexaenoic acid (DHA) and eicosapentaenoic acid (EPA), conjugated linoleic acid (CLA) also known as octadecadienoic acid, oil soluble vitamins such as vitamin A, E and D or any combination thereof can be incorporated into jellied pectin based food products at concentrations ranging from about 0.05 to about 20 wt. % based on the total weight of jellied food product. The oil soluble vitamins are likely to be added at reduced levels, i.e. about 0.01 to about 0.1 wt. %. But the total amount of hydrophobic ingestible substances selected from the group consisting of nutraceuticals, prebiotics, herb extracts, plant extracts, such as phytosterols, such as stigmasterol, campesterol and b-sitosterol, corresponding stanols and esters thereof, fish oils such as omega 3 fatty acids such as docosahexaenoic acid (DHA) and eicosapentaenoic acid (EPA), conjugated linoleic acid (CLA) also known as octadecadienoic acid, oil soluble vitamins such as vitamin A, E and D or any combination thereof will range from about 4 to about 20 wt. % based on the total weight of the jellied food product.

A fortified jellied confectionery product comprises
a) about 4 to about 20 wt. %, for example about 5 to about 20 wt. %, especially about 6 to about 20 wt. % of a ingestible hydrophobic active, b) at least about 25 wt. % of a sweetener, typically about 50 wt. % to about 85 wt. %, c) an acidifying agent,
d) an emulsifying pectin,
and
e) a gelling pectin,
wherein the wt. ratio of the component a) to the component d) ranges from about 5:1 to about 35:1, for example about 6:1 to about 25:1,
and
the wt. % is based on the total weight of the confectionery product.

This application also embodies a method of fortifying a jelly by combining at least about 4 to about 20 wt. %, for example about 5 to about 20 wt. % of an ingestible hydrophobic active(s) a), at least about 25 wt. %, typically about 50 wt. % to about 85 wt. % of a sweetener b), an acidifying agent c), an emulsifying pectin component d) and e) a gelling pectin, wherein the wt. ratio of the hydrophobic active(s) (ingestible hydrophobic active) a) to the emulsifying pectin d) ranges from about 5:1 to about 35:1, for example about 6:1 to about 25:1 and the wt. % is based on the total weight of the confectionery product.

For example the weight of a) is 12 g and the weight of d) is 0.5, then the wt. ratio would be 24:1.

DETAILED DESCRIPTION OF THE INVENTION

Use of the singular forms "a," "an," and "the" include plural references unless the context clearly dictates otherwise. Thus, for example, reference to "a active" includes a plurality of actives.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value. Thus for example the term "about" indicates a variation of ±1% to 5%.

Where a value is explicitly recited, it is to be understood that values which are about the same quantity or amount as the recited value are also within the scope of the invention, as are ranges based thereon.

Unless defined otherwise or the context clearly dictates otherwise, all technical and scientific terms used herein have the same meaning as commonly understood by one of ordinary skill in the art to which this invention belongs.

When the term "wt. %" is used herein the basis of the weight will normally be the total weight of the fortified confectionery unless otherwise specified.

Jellied Food Product

The terms "gelled" or jellied food product is used synonymously throughout this application and the terms are meant to signify that the final product is in gel form.

The shape of the jellied or gelled confectionery product is not essential.

For the purpose of the present invention, the gelled or jellied food product is semisolid at ambient temperature (i.e. in the approx. range between 10 and 40° C.). Gelled products are characterized by having a relatively soft and chewy texture. Typical gelled products include gelatin based products as well as products based on certain types of carrageenan, alginate, starches, agarose, β-glucan, gellan gum, pectin or cellulose compounds.

In general a gel can be described as a colloid in which the disperse phase has combined with the dispersion medium to produce a semisolid material, e.g., a jelly. A system is gel-like at a given frequency as soon as G' (storage modulus which concerns the solid part of the material) is higher than G" (loss modulus which concerns the liquid-like response on the material).

The present inventive "jellied confectionery" is considerably less hard than gelatin based confectioneries and easier to chew in significant quantities.

Component a) Hydrophobic Ingestible Active(s)

The term "hydrophobic active(s)" as used herein means ingestible hydrophobic actives such as nutraceuticals, functional foods, fish oils, prebiotics, herb or other plant extracts.

Examples of materials which can be delivered in this way include flavones (e.g. ipriflavone), vitamins (e.g. vitamin E, vitamin D (e.g. D3), vitamin B (e.g. B12)), .alpha.-lipoic acid, biotin, minerals (e.g. chromium, zinc, iron, and selenium compounds), indoles (e.g. indole-3-carbinol), glucosamines (e.g. N-acetyl-glucosamine), fatty acids (e.g. EPA, DHA and .omega.-3 acids, e.g. DGLA), 4-hydroxyandrostenedione, amantidine, ribivarine, grape seed extract, betain, niacin, folic acid, herb extracts (e.g. rad. rubine, fructus ameos, vishagal, herb virgaurae, taraxacic, aesin, rad. rubine, and rad. taraxacic) or conjugated linoleic acid.

The hydrophobic active may be encapsulated or microencapsulated. For example, unsaturated fatty acids and/or phytosterols may be encapsulated as described in U.S. Pat. No. 6,444,242 or PCT publication WO 2010/0149759 both herein incorporated by reference in their entirety.

The fatty acids are for example unsaturated fatty acids, polyunsaturated fatty acids (PUFAs) or long-chain polyunsaturated fatty acids (LC-PUFAs). Highly unsaturated fatty acids are for example highly unsaturated fatty acids selected from the group consisting of omega-3 and omega-6 fatty acids. The level of free fatty acids for example is generally below 5.0% by weight and more likely to be below about 0.5% by weight based on the total weight of highly unsaturated fatty acids. Particularly the fatty acids may originate from marine oil, i.e. fish oil, but may also be derived from algae oil, plant based oil or microbial oil. The fatty acids may be in different forms such as free fatty acids, esters, e.g. C1-C4 alkyl esters, for example ethyl esters, phospholipids, mono/di/tri-glycerides and salts thereof.

Eicosapentaenoic acid ($C_{20:5}$ omega-3, EPA) and docosahexaenoic acid ($C_{22:6}$ omega-3, DHA) are the most important highly unsaturated fatty acids. The jellied food product when it contains highly unsaturated fatty acids will typically contain EPA and DHA combinations. For example BASF makes a product of highly refined highly concentrated omega 3 oils, in liquid oil form with tradename Pronova® P. In one embodiment, the fatty acid is a fatty acid oil mixture comprising mixtures of EPA and DHA. In some embodiments of the present application, the weight ratio of EPA:DHA of the fatty acid oil mixture ranges from about 1:10 to about 10:1, from about 1:8 to about 8:1, from about 1:6 to about 6:1, from about 1:5 to about 5:1, from about 1:4 to about 4:1, from about 1:3 to about 3:1, or from about 1:2 to 2 about:1. In at least one embodiment, the weight ratio of EPA:DHA of the fatty acid oil mixture ranges from about 1:2 to about 2:1. In at least one embodiment, the weight ratio of EPA:DHA of the fatty acid oil mixture ranges from about 1:1 to about 2:1. In at least one embodiment, the weight ratio of EPA:DHA of the composition ranges from about 1.2 to about 1.3. Such fatty acid oil mixture include, but are not limited to, the following examples: about 360 mg EPA and 240 mg DHA pr g oil, 400 mg EPA and 200 mg DHA pr g oil, 500 mg EPA and 200 mg DHA pr g oil, 150 mg EPA and 500 mg DHA pr g oil, 460 mg EPA and 380 mg DHA pr g oil, above 900 mg EPA pr g oil, above 900 mg DHA pr g oil, and 97% EPA. In addition, other omega-3 fatty acids than EPA and DHA may be present.

U.S. Pat. No. 6,444,242 describes the encapsulation of highly unsaturated fatty acids combined with a carrier, such as caseinate, to produce a powder.

WO 2010/0149759 discloses a microparticle including a collection of such microparticles and a nutritional or pharmaceutical product comprising such microparticles. The microparticles comprise a fat soluble fraction and a matrix for forming the microparticle and embedding the fat soluble fraction. The fat soluble fraction comprises a docosahexaenoic acid (DHA) moiety.

The matrix of WO 2010/0149759 comprises a hydrocolloid material and optionally also a plasticizer.

Phytosterols are sterols which are isolated from plants and yeasts. The most important members of this class of compounds are, for example are, stigmasterol, campesterol and b-sitosterol and also hydrogenated derivatives such as campestanol and b-sitostanol. Phytosterols are structurally similar to cholesterol. Since, for example, b-sitosterol inhibits the absorption of cholesterol, it is used as a lipid reducer for the prophylaxis of arteriosclerosis and hyperlipaemia.

To lower the cholesterol level, phytosterols are frequently being used as additives in dietetic foods, for example margarines.

The phytosterols are insoluble in water, while only a low solubility has been found in fats and oils. This limited solubility frequently complicates the use of phytosterols in the production of food preparations and cosmetic products and incorporation into jellied food product.

For the purposes of the present application phytosterols are for example the three compounds stigmasterol, campesterol and b-sitosterol, and also their hydrogenated derivatives stigmastanol, campestanol and b-sitostanol. The phytosterol mixtures may be produced from soybean oil by distillation, which consist essentially of stigmasterol, campesterol and b-sitosterol.

The phytosterols may be microencapsulated or encapsulated as described above, which protects the phytosterols from oxidation and facilitates their handling. An example of their microencapsulation procedure can be found in U.S. Patent Application Publication US 2009/0047355 hereby incorporated by reference in its entirety.

A commercial example of a sterol ester and free sterol oil is sold under the tradename Vegapure® for example.

The present claims require about 4 to about 20 wt. % of a hydrophobic active(s). What is meant by the wt. % is the active per se makes up about 4 to about 20 weight % of the total weight of the jellied food product. For example, the actives of combinations of EPA/DHA or any combination of phytosterols, phytostanol, esters of phytosterols, esters of phytostanols or conjugated linoleic acids or derivatives thereof make up about 4 to about 20 wt. % of the total weight of the jellied food product. Thus the range of about 4 to about 20 wt. % of the hydrophobic active or actives refers to the total hydrophobic active and may comprise more than one hydrophobic active. A more typical total hydrophobic active ranges is from about 4 to about 15 wt. % or about 5 to about 15 wt. %.

Actives other than the phytosterols and/or highly unsaturated fatty acids include conjugated linoleic acid without limitation, such as pharmaceutical compositions, synthetic or naturally-derived pharmaceutically-active molecules, vaccines, proteins, peptides, nucleotides, hormones, vitamins, minerals, dietary supplements, natural products as well as nutraceutical, cosmeceutical and nutricosmetic ingredients may also be included in the jellied food product.

Conjugated Linoleic Acid (CLA)

CLA, also known as octadecadienoic acid, is a collective name for positional and geometric isomers of linoleic acid with conjugated double bonds at carbon atoms 10 and 12 or 9 and 11 in the various cis-trans configurations, i.e. cis-9, trans-11; cis-9, cis-11; trans-9, trans-11; cis-10, trans-12; cis-10, cis-12; trans-10, cis-12; and trans-10, trans12. CLA thus differs from ordinary linoleic acid which has double bonds at carbon atoms 9 and 12.

CLA has several unique properties, one of which is the ability to reduce the percentage of fat relative to total body mass when administered orally as a nutritional supplement. CLA is available commercially under the trade name Tonalin® for example.

Thus the ingestible hydrophobic active may be selected from the group consisting of fatty acids, including omega-3 fatty acids, omega-6 fatty acids, such as docosahexaenoic acid (DHA) and eicosapentaenoic acid (EPA), conjugated linoleic acid (CLA) also known as octadecadienoic, phytochemicals, including phytosterols, such as stigmasterol, campesterol and b-sitosterol, corresponding stanols and esters thereof; coenzymes, including Coenzyme Q10 and oil soluble vitamins such as vitamin A, E and D.

The most important fortifying hydrophobic actives are selected from the group consisting of omega-3 fatty acids, omega-6 fatty acids, such as docosahexaenoic acid (DHA) and eicosapentaenoic acid (EPA), conjugated linoleic acid (CLA), phytosterols, such as stigmasterol, campesterol and b-sitosterol, corresponding stanols and esters thereof and mixtures of the above actives.

Pectin

Pectin is a structural polysaccharide found in green plants, for example, in fruits and vegetables and may be extracted from citrus fruit peel. At a molecular level, pectin consists of a linear chain of galacturonic acid units linked through .alpha.-1,4 glycosidic bonds (the 'smooth region'). This regular structure is interrupted by rhamnopyranosyl residues with side chains of neutral sugars (the 'hairy region').

Pectin is also found in the pulp and skins of fruits. Chemically, pectin is a polysaccharide containing about 300 to 1000 monosaccharide units, the principal monosaccharide unit being the D-galacturonic acid group. The length and complexity of the polysaccharide chain and the order of the monosaccharide units within the chain may vary depending on the source of the pectin. Typically, the molecular weight of pectin is about 50,000 to 150,000 Daltons. The D-galacturonic acid groups of the polysaccharide chain may be esterified with methyl groups. Pectins are categorized by the degree of esterification (DE) of the D-galacturonic acid groups. DE is defined as the number of esterified galacturonic acid groups expressed as a percentage (0-100%) of the total number of galacturonic acid groups present in the molecule. A high methoxyl (HM) pectin comprises DE of 50% or greater, whereas a low methoxyl (LM) pectin comprises DE of less than 50%.

The DE greatly influences the properties of pectin. For example, HM pectins generally form thermally irreversible gels in the presence of sufficient sweetener concentration and at a pH ranging from about 2.5 to about 4.0, for examples for example about 3.0 to about 3.8. LM pectins form thermally reversible gels in the presence of calcium ions at a pH of about 2.5 to about 4.0, for example about 3.0 to about 3.8. The lower the DE, the slower the rate of gel formations. Additionally, the molecular weight (MW) of pectin also affects its properties. High MW pectins generally tend to gel more easily and rapidly whereas low MW pectins, in contrast, tend to gel more slowly. The degree of branching of the D-galaturonic acid chains also affects the gelling property of pectin.

Thus the HM pectins and LM pectins can both be considered gelling pectins. Additionally HM pectins and LM pectins can be considered emulsifying pectin. Whether the pectin works as a gelling or emulsifying pectin will depend on a combination of characteristics such as molecular weight, branching and esterification degree.

For example, a typical gelling pectin may be a HM pectin, wherein the pectin contains methoxy esterified galacturonic acid groups, wherein the degree of esterification of the galacturonic acid groups is 50% or greater. The degree of esterification is defined as the number of esterified galacturonic acid groups as a percentage of the total number of galacturonic acid groups present in the pectin. Such a pectin if formulated under acidic (a pH. ranging from about 2.5 to about 4.0 with sweetener content of at least about 25 wt. % of the formulation may gel.

LM pectin can also be considered a gelling pectins and are especially useful to create sugar free or low sugar gels. In order to get these LM pectin formulations to gel, calcium ion and low pH formulations are advised. By low pH it is meant a pH ranging from about 2.5 to about 4, for example about 3 to about 3.8 or about 3.5.

Emulsifying pectins do not gel even under acidic conditions with high sweetener content when used without a gelling pectin. For example, see comparative example 2. The emulsifying pectins can be derived from beet, apple, potato and pear. The emulsifying pectin may be high methoxy or low methoxy pectin.

The emulsifying pectin d) may be defined as a pectin which fails to gel the same confectionery product of embodiment 1 but without component e).

U.S. Pat. No. 8,435,581 incorporated by reference in its entirety teaches emulsifying pectins which may be used to increase the emulsifying properties of conventional emulsifiers such as Arabic gum in beverages.

Emulsifying pectins such as beet, potato, apple and pear pectins contain a higher proportion of side chains as compared with standard gelling pectins. Beet pectin also has a higher protein content, of about 10%, than that in standard pectin, of about 2 or 3%. The increased side chains and protein content provide for improved emulsifying properties of beet pectin as compared with standard pectin. The emulsifying pectins do not give suitable setting or gelling characteristics to the jelly. Thus in the present case, the emulsifying pectin is combined with gelling pectin to achieve the needed degree of gelling.

The inventors have discovered that the carbohydrate jelly when comprised of at least two types of pectin, an emulsifying pectin and a gelling pectin, allows for the right gelling effect in combination with the correct emulsifying effect for homogenous incorporation of the relatively high amounts of ingestible hydrophobic active in the confection.

Thus components d) and e) for the inventive jelly comprise an emulsifying pectin such as beet, potato, apple or pear pectin, and a gelling pectin often derived from a fruit pectin (such as apple or citrus derived).

When the term gelling pectin is used this means for example a fruit pectin, such as citrus pectin or apple pectin. For example, the fruit pectin may be obtained from apple pomace, citrus pellets, i.e. dried residues, from the production of orange juice, lemon juice and/or lime juice.

The emulsifying pectin is normally produced from sugar beets, potato, apple or pears, for example sugar beet cossettes.

The emulsifying pectin and the gelling pectin are different from one another.

The weight ratio of emulsifying pectin to gelling pectin will vary widely depending upon the amount of the hydrophobic ingestible active to be incorporated into the jellied confectionery. For example, the weight ratio of emulsifying pectin to gelling pectin will range from about 1:1 to about 1:4, most typically about 1:1.2 to about 1:3.5. For example, the greater amount of ingestible hydropobic active will normally require more emulsifying pectin. This in turn may change the amount of gelling pectin required to make the confectionery set.

Sweeteners

Sweeteners are exactly what the name implies. They make the jellied food product more palatable and may include sugars or sugar substitutes. For example, sweeteners of the fortified confectionery comprise sugars and/or sugar substitutes selected from the group consisting of glucose, fructose, sucrose, maltose, galactose, xylose, dextrose, trehalose, raffinose, stachyose, sorbitol, mannitol, targatose, raftilose, dextrin corn syrups, honey, molasses, malt syrups, corn syrup solids, invert sugar, maltodextrins, acesulfame-K and sodium and calcium salts thereof, saccharin and its various salts such as the sodium salt; dipeptide sweeteners such as aspartame; dihydrochalcone compounds, glycyrrhizin; *Stevia rebaudiana* (Stevioside); chloro derivatives of sucrose such as sucralose, natural intensive sweeteners, such as Lo Han Kuo, food grade gums such as gum Arabic, carboxymethylcellulose (CMC), xanthan, locust bean gum, agar (a polysaccharide derived from red seaweeds) and mixtures thereof.

The fortified jellied confectionery sweetener will make up at least about 25 weight % of the confectionery, for example the sweetener source(s) range from about 30 to about 85 wt. % of the total weight of the confectionery product. More typically the sweetener will make up about 50% to about 85 wt. % of the confectionery product.

Acidifying Agent

The term "acidifying agent" as used herein means weak organic acids or can be converted to organic acid in aqueous solution. The acidifying agents include but are not limited to acetic acid, malic acid, lemon juice, citric acid, tartaric acid, ascorbic acid, fumaric acid, glucono-delta-lactone and salts thereof.

The acidifying agent may make up about 0.5 to about 2 or 3 weight % of the total weight of the confectionery typically.

The typical pH of the formulation will range from about 2.4 to about 4.0 pH.

The jellied food product may contain other optional ingredients such as a plasticizer, a thickener, a humectant, an alkalizing agent, flavoring and sweetening agents, coloring agents and additional active ingredients which are different than the ingestible hydrophobic active (such as fatty acids and/or phytosterols, conjugated linoleic acids). But these ingredients also should be suitable for ingestion.

The jellied food product is used for the oral administration of ingestible hydrophobic active ingredient. Ingestion would occur by placing the jellied product in the oral cavity of a human or animal.

Advantageously, ingestion in this manner is simplified and more desirable than when compared with more traditional tablets (such as gelatin tablets) containing the hydrophobic active. The jellied food product dissolves readily without a liquid and is easy to chew and to swallow.

The presently jellied food product containing the hydrophobic active and two types of pectin may also include a plasticizer especially for a hydrophobic active that may be microencapsulated.

Typical plasticizers may be selected from the group consisting of lactose, maltose, saccharose, glucose, glucose syrup, fructose, lactose, invert sugar, sorbitol, manitol, trehalose, targatose, pullulan, raftilose (oligofructose), dextrin, maltodextrin, glycerin and mixtures thereof.

When a plasticizer is included, for example in a microencapsulated active, the weight ratio of plasticizer to carrier or hydrocolloid (particularly caseinate) can be of 10:1 to 1:20 which can provide an increased mechanical and oxidative stability as the encapsulation minimizes the proportion of free surface exposure of the highly unsaturated fatty acids and/or phytosterol.

Water Soluble Film Formers

Water soluble film formers may also be included in the jellied food product and may be selected from the group consisting of polyvinylpyrollidone, gelatin, hydroxypropylcelluose, polyvinyl alcohol, maltodextrin, pullulan, methylcellulose, sodium alginate, arabic gum, carboxymethylcellulose, and propylene glycol alginate.

Additional Emulsifier of the Jellied Food Product

The jellied food product may also contain an additional emulsifier besides pectin. This may enhance the texture of the jelly. Additionally, it may also help to distribute the hydrophobic active evenly within the film as well as other additives such as flavors and other oil soluble materials.

The emulsifiers may, for example, be selected from the group consisting of lecithin, polysorbate (such as polysorbate 80), polyoxyethylene, poloxamer, monoglycerides, gum Arabic, CMC (carboxymethylcellulose), xanthan, locust bean gum and derivatives thereof and sodium lauryl sulfate.

Other Optional Additives to the Jellied Confectionery Product

In addition to components a) through e), other additives such as alkalizing agents for adjusting the pH of the film composition, flavoring agents, coloring agents, humectants, starches such as regular corn, tapioca, potato, rice, wheat, sago and the like and thickeners are commonly added.

Alkalizing Agents are for Example Sodium Bicarbonate.

Flavoring agents are many and varied. Any flavor or mixture of flavor acceptable for food or feed use is envisioned.

Flavors

Flavors may be chosen from natural and synthetic flavoring liquids. An illustrative list of such agents includes volatile oils, synthetic flavor oils, flavoring aromatics, oils, liquids, oleoresins or extracts derived from plants, leaves, flowers, fruits, stems and combinations thereof. A non-limiting representative list of examples includes mint oils, cocoa, and citrus oils such as lemon, orange, grape, lime and grapefruit and fruit essences including apple, pear, peach, grape, strawberry, raspberry, cherry, plum, pineapple, apricot or other fruit flavors.

Coloring Agents

The coloring agents are selected from food grade colorants.

Thickening Agents

Thickeners are used with jellied food product and include for example, maltodextrin, corn starch and other well-known food grade thickeners. A representative listing of food grade thickeners are gums, such as guar gum, locust bean gum, xanthan gum, ghatti gum, and mixtures of such gums. Other useful thickeners include gelatin, carboxymethylcellulose (CMC), tragacanth and plant-derived hydrocolloids, such as agar, alginate, carrageenan (kappa, iota, and lambda), and mixtures thereof.

Humectants

Humectants are used to keep the jellied food product humid. Examples of acceptable food grade humectants are propylene glycol and medium chain triglycerides.

The solvent will normally comprise mainly water but small quantities of acceptable organic solvents are acceptable such as propylene glycol and ethanol. As the total solids may make up about 20 to about 75 wt. % the solvent will vary from about 25 to about 80 wt. percent of the total wet mixture of solids used to make the dried ingestible film.

Stabilizers

Stabilizers can be used with the ingestible hydrophobic active itself and comprise about 0.01 to 10% by weight of at least one antioxidant selected from the group consisting of T-butyl hydroxyl toluene (BHT), T-butyl hydroxyl anisole (BHA), ascorbic acid, sodium ascorbate, citric acid, sodium citrate EDTA and its salts, tocopherols, preferably natural tocopherol and particularly preferably gamma-tocopherol, tert.-butylhydroquinone (TBHQ), ethoxyquine, propyl gallate and herb extracts, preferably rosemary and/or oregano extract.

Furthermore, it is advantageous to include such stabilizers not only in the composition of the fortified jelly but also close to the hydrophobic active where it is. These stabilizers may function as antioxidants increasing the hydrophobic active stability to light and oxygen.

Thus stabilizers are advantageously present in a microencapsulated hydrophobic active systems, that is, is present in the matrix hydrocolloid material which carries and protects the hydrophobic active at amounts which range from about 0.1 to about 10 wt. % of the hydrophobic active itself.

The following embodiments of the invention are below:

E1. A fortified jellied confectionery product comprising
a) about 4 to about 20 wt. %, for example about 5 to about 20 wt. %, especially about 6 to about 20 wt. % of a ingestible hydrophobic active b) at least about 25 wt. % or greater of a sweetener, c) an acidifying agent,
d) an emulsifying pectin,
and
e) a gelling pectin,
wherein the wt. ratio of the component a) to the component d) ranges from about 5:1 to about 35:1, for example about 6:1 to about 25:1,
and
the wt. % is based on the total weight of the confectionery product.

E2. The fortified jellied confectionery product according to embodiment 1, wherein the emulsifying pectin d) may be defined as any pectin which fails to gel the same confectionery product of embodiment 1 but without component e).

E3. The fortified jellied confectionery product according to either embodiment 1 or 2, wherein the emulsifying pectin is derived from beet, potato, apple or pear pectin.

E4. The fortified jellied confectionery product according to any one of embodiments 1 to 3, wherein the emulsifying pectin is a beet pectin.

E5. The fortified jellied confectionery product according to any one of the embodiment 1 to 4, wherein the weight ratio of emulsifying pectin to gelling pectin will range from about 1:1 to about 1:4, most typically about 1:1.2 to about 1:3.5.

E6. The fortified jellied confectionery product according to any one of embodiments 1 to 5, wherein the emulsifying pectin is a low methoxyl pectin (LM) comprising a DE (degree of esterification) of less than 50%.

E7. The fortified jellied confectionery product according to any one of embodiments 1 to 6, wherein the emulsifying pectin is a high methoxy pectin (HM) comprising a DE (degree of esterification) of 50% or above.

E8. The fortified jellied confectionery product according to any one of the preceding embodiments, wherein the ingestible hydrophobic active is selected from the group consisting of essential fatty acids, including omega-3 fatty acids, omega-6 fatty acids, such as docosahexaenoic acid (DHA) and eicosapentaenoic acid (EPA), conjugated linoleic acid (CLA) also known as octadecadienoic, phytochemicals, including phytosterols, such as stigmasterol, campesterol and b-sitosterol, corresponding stanols and esters thereof; coenzymes, including Coenzyme Q10 and oil soluble vitamins such as vitamin A, E and D.

E9. The fortified jellied confectionery product according to any one of the preceding embodiments, wherein the confectionery product is essentially gelatin free, for example contains less than 0.01, for example less than 0.001 wt % gelatin and the wt. % is based on the total weight of the confectionery product.

E10. The fortified jellied confectionery product according to any one of the preceding embodiments, wherein the pH of the product ranges from about 2.5 to about 4.0, for example is ranging from about 3 to about 3.8 or about 3.5.

E11. The fortified jellied confectionery product according to any one of preceding embodiments, wherein the gelling pectin is a high methoxy (HM) pectin comprising a DE (degree of esterification) of 50% or greater.

E12. The fortified jellied confectionery product according to any one of the preceding embodiments, wherein the gelling pectin is a low methoxy (LM) pectin and comprises a DE (degree of esterification) below 50%.

E13. The fortified jellied confectionery product according to any of the preceding embodiments, wherein the sweetener is a sugar or sugar substitute and is selected from the group consisting of glucose, fructose, sucrose, maltose, galactose, xylose, dextrose, trehalose, raffinose, stachyose, sorbitol, mannitol, targatose, raftilose, dextrin corn syrups, honey, molasses, malt syrups, corn syrup solids, invert sugar, maltodextrins, acesulfame-K and sodium and calcium salts thereof, saccharin and its various salts such as the sodium salt; dipeptide sweeteners such as aspartame; dihydrochalcone compounds, glycyrrhizin; *Stevia rebaudiana* (Stevioside); chloro derivatives of sucrose such as sucralose, natural intensive sweeteners, such as Lo Han Kuo, food grade gums such as gum Arabic, carboxymethylcellulose (CMC), xanthan, locust bean gum, agar (a polysaccharide derived from red seaweeds) and mixtures thereof.

E14. The fortified jellied confectionery product according to embodiment 13, wherein the sweetener is a sugar substitute and is selected from xylitol, sorbitol and mannitol, aspartame, acesulfame-K and sodium and calcium salts thereof, sucralose, saccharin, lo han guo and stevia both derived from fruit and roots, respectively.

E15. The fortified jellied confectionery product according to embodiment 13, wherein the sweetener is a sugar and is selected from the group consisting of fructose, glucose, sucrose, corn syrups, honey, molasses, malt syrups, corn syrup solids and maltodextrins and mixtures thereof.

E16. The fortified jellied confectionery product according to any one of the preceding embodiments, wherein the sweetener concentration ranges from about 30 to about 85, for example about 50 to 85 wt. % of the total weight of the confectionery product.

E17. The fortified jellied confectionery product according to any one of the preceding embodiments, wherein the acidifying agent is selected from the group consisting of acetic acid, malic acid, lemon juice, citric acid, tartaric acid, ascorbic acid, fumaric acid, glucono-delta-lactone and salts thereof.

E18. The fortified jellied confectionery product according to any one of the preceding embodiments, wherein the ingestible hydrophobic active includes a conjugated linoleic acid.

E19. The fortified jellied confectionery product according to any one of the preceding embodiments, wherein the ingestible hydrophobic active includes a fatty acid oil mixture comprising mixtures of EPA and DHA, typically the weight ratio of EPA:DHA of the fatty acid oil mixture ranges from about 1:10 to about 10:1, for example from about 1:8 to about 8:1, from about 1:6 to about 6:1, from about 1:5 to about 5:1, from about 1:4 to about 4:1, from about 1:3 to about 3:1, or from about 1:2 to 2 about:1.

E20. The fortified jellied confectionery product according to any one of the preceding embodiments, wherein the ingestible hydrophobic active includes omega-3 fatty acids, omega-6 fatty acids, such as docosahexaenoic acid (DHA) and eicosapentaenoic acid (EPA) and/or a phytosterols.

E21. The fortified jellied confectionery product according to any one of the preceding embodiments, wherein the hydrophobic active is microencapsulated.

E22. The fortified jellied confectionery product according to any of the preceding embodiments, wherein the sweetener concentration ranges from about 40 to about 80 wt. % of the total weight of the confectionery product.

E23. The fortified jellied confectionery product according to any one of the preceding embodiments, wherein the emulsifying pectin d) makes up about 0.1 to about 2 wt. % of the total weight of the confectionery.

E24. The fortified jellied confectionery product according to any one of the preceding embodiments wherein the emulsifying pectin d) comprises a beet pectin and the gelling pectin e) is a HM pectin.

E25. The fortified jellied confectionery product according to any one of the preceding embodiments, wherein the confectionery further contains 0.01 to 10% by weight of at least one antioxidant selected from the group consisting of T-butyl hydroxyl toluene (BHT), T-butyl hydroxyl anisole (BHA), ascorbic acid, sodium ascorbate, citric acid, sodium citrate EDTA and its salts, tocopherols, preferably natural tocopherol and particularly preferably gamma-tocopherol, tert.-butylhydroquinone (TBHQ), ethoxyquine, propyl gallate and herb extracts, preferably rosemary and/or oregano extract.

E26. The fortified jellied confectionery product according to any one of the preceding embodiments, wherein the confectionery further contains optional ingredients selected from the group consisting of flavoring agents, sweeteners, coloring agents, humectants, starches and thickeners.

E27. The fortified jellied confectionery product according to any one of the preceding embodiments, wherein the sweetener is a sugar substitute, the gelling pectin is a LM pectin, the emulsifying pectin is a beet pectin and the pH of the product ranges from about 3.0 to about 3.8 and the product further contains a source of calcium ions.

E28. The fortified jellied confectionery product according to any of the preceding embodiments, wherein the sweetener is a sugar substitute, the gelling pectin is a HM pectin, the emulsifying pectin is a beet pectin and the pH of the product ranges from about 3.0 to about 3.8.

E29. The fortified jellied confectionery product according to any of the preceding embodiments, wherein the sweetener is a sugar selected from group consisting of fructose, glucose, sucrose, corn syrups, honey, molasses, malt syrups, corn syrup solids and maltodextrins and mixtures thereof, the gelling pectin is a HM pectin, the emulsifying pectin is a beet pectin and the pH of the product ranges from about 3.0 to about 3.8.

E30. A method of fortifying a jelly by combining at least about 4 to about 20 wt. %, for example about 5 to about 20 wt. % of an ingestible hydrophobic active(s) a), at least about 25 wt. %, typically about 50 wt. % to about 85 wt. % of a sweetener b), an acidifying agent c), an emulsifying pectin component d) and a gelling pectin e), wherein the wt. ratio of the hydrophobic active(s) (ingestible hydrophobic active) a) to the emulsifying pectin d) ranges from about 1 to about 5 to about 1 to 35, for example about 1 to about 6 to about 1 to about 25 and the wt. % is based on the total weight of the confectionery product.

E31. The method according to embodiment 30, wherein the ingestible hydrophobic active is selected from the group consisting of essential fatty acids, including omega-3 fatty acids, omega-6 fatty acids, such as docosahexaenoic acid (DHA) and eicosapentaenoic acid (EPA), conjugated linoleic acid (CLA) also known as octadecadienoic, phytochemicals, including phytosterols, such as stigmasterol, campesterol and b-sitosterol, corresponding stanols and esters thereof; coenzymes, including Coenzyme Q10 and oil soluble vitamins such as vitamin A, E and D.

E32. The method according to either embodiments 30 or 31, wherein the sweetener comprises a sugar and/or a sugar substitute and is selected from the group consisting of glucose, fructose, sucrose, maltose, galactose, xylose, dextrose, trehalose, raffinose, stachyose, sorbitol, mannitol, targatose, raftilose, dextrin corn syrups, honey, molasses, malt syrups, corn syrup solids, invert sugar, maltodextrins, acesulfame-K and sodium and calcium salts thereof, saccharin and its various salts such as the sodium salt; dipeptide sweeteners such as aspartame; dihydrochalcone compounds, glycyrrhizin; *Stevia rebaudiana* (Stevioside); chloro derivatives of sucrose such as sucralose, natural intensive sweeteners, such as Lo Han Kuo, food grade gums such as gum Arabic, carboxymethylcellulose (CMC), xanthan, locust bean gum, agar (a polysaccharide derived from red seaweeds) and mixtures thereof.

Fortified Confectionery Jelly Formulations

The emulsifying Pectin in examples below is a beet pectin.

The gelling Pectin in examples below is a high methoxy esterified fruit pectin (HM pectin) or a LM pectin.

Example 1

TABLE 1

Fortified Jelly Containing 5.8 Wt. % Conjugated Linoleic Acid (CLA)

| Order of Addition | Ingredient | Wt. % | Wt. in grams |
|---|---|---|---|
| A | Water | 25.88 | 207.06 |
|  | Sodium Citrate Di-hydrate | 0.35 | 2.76 |
|  | Citric Acid, mono-hydrate | 0.45 | 3.45 |
| B | Jelling Pectin | 0.74 | 6.3 |
|  | Emulsifying Pectin | 0.55 | 4 |
|  | Sugar | 4.31 | 34.5 |
| C | Sugar | 39.26 | 314.04 |
|  | High Fructose Corn Syrup 42 DE | 25.88 | 207.06 |
| D | Citric Acid, 50% w/w | 1.73 | 13.80 |
|  | Lemon Cake flavor | 0.86 | 6.9 |
|  | Beta carotene | 0.01 | 0.055 |
| E | Conjugated Linoleic Acid | 5.8 | 50 |
| Comparative Example 1 - No Emulsifying Pectin ||||
| A | Water | 25.88 | 207.06 |
|  | Sodium Citrate Di-hydrate | 0.35 | 2.76 |
|  | Citric Acid, mono-hydrate | 0.43 | 3.45 |

TABLE 1-continued

Fortified Jelly Containing 5.8 Wt. % Conjugated Linoleic Acid (CLA)

| Order of Addition | Ingredient | Wt. % | Wt. in grams |
|---|---|---|---|
| B | Jelling Pectin | 1.29 total | 10.35 |
|  | Sugar | 4.31 | 34.5 |
| C | Sugar | 39.26 | 314.04 |
|  | High Fructose Corn Syrup 42 DE | 25.88 | 207.06 |
| D | Citric Acid, 50% w/w | 1.73 | 13.80 |
|  | Lemon Cake flavor | 0.86 | 6.9 |
|  | Beta carotene | 0.01 | 0.055 |
| E | Conjugated Linoleic Acid | 5.8 | 50 |

Batch seized up immediately and became lumpy and unworkable.

Example 2

TABLE 2

Fortified Jelly Containing 8.7 Wt. % Conjugated Linoleic Acid

| Order of Addition | Ingredient | Wt. % | Wt. in grams |
|---|---|---|---|
| A | Water | 24.93 | 199.41 |
|  | Sodium Citrate Di-hydrate | 0.33 | 2.65 |
|  | Citric Acid, mono-hydrate | 0.42 | 3.32 |
| B | Gelling Pectin | 0.87 | 7.4 |
|  | Emulsifying Pectin | 0.38 | 4.14 |
|  | Sugar | 4.15 | 33.23 |
| C | Sugar | 37.81 | 302.45 |
|  | High Fructose Corn Syrup 42 DE | 24.93 | 199.41 |
|  | Sorbitol | 4.49 | 35.89 |
| D | Citric Acid, 50% w/w | 0.83 | 6.6 |
|  | Lemon Cake flavor | 0.86 | 6.6 |
|  | Beta carotene | 0.01 | 0.33 |
| E | Conjugated Linoleic Acid (CLA) | 8.7 | 75 |
| Comparative Example 2- No Gelling Pectin ||||
| A | Water | 25.88 | 207.06 |
|  | Sodium Citrate Di-hydrate | 0.35 | 2.76 |
|  | Citric Acid, mono-hydrate | 0.43 | 3.45 |
| B | Xanthan Gum | 0.1 | .69 |
|  | Emulsifying Pectin | 1.29 | 10.35 |
|  | Sugar | 4.31 | 34.5 |
| C | Sugar | 39.26 | 314.04 |
|  | High Fructose Corn Syrup 42 DE | 25.88 | 207.06 |
| D | Citric Acid, 50% w/w | 1.73 | 13.80 |
|  | Lemon Cake flavor | 0.86 | 6.9 |
|  | Beta carotene | 0.01 | 0.055 |
| E | Conjugated Linoleic Acid | 5.8 | 50 |

Batch did not set, remained liquid, however CLA emulsified into the solution homogenously.

When emulsifying pectin only is used in the same formulations at the same total pectin concentration (1.29) in example 1, the formulation fails to gel or set.

Example 3

TABLE 3

Fortified Jelly containing 11.5 wt. % Omega 3 Oils + Sterol Esters.

| Order of Addition | Ingredient | Wt. % | Wt. in grams |
|---|---|---|---|
| A | Water | 24.82 | 198.59 |
|   | Sodium Citrate Dihydrate | 0.33 | 2.65 |
|   | Citric Acid, monohydrate | 0.41 | 3.31 |
| B | Gelling Pectin | 0.98 | 7.94 |
|   | Emulsifying Pectin | 0.66 | 5.30 |
|   | Sugar | 4.14 | 33.10 |
| C | Sugar | 37.65 | 301.20 |
|   | Sorbitol | 4.47 | 35.75 |
|   | High Fructose Corn Syrup 42 DE | 24.82 | 198.59 |
| D | Citric Acid, 50% w/w | 0.83 | 6.62 |
|   | Flavor | 0.83 | 6.62 |
|   | Color | 0.04 | 0.33 |
| E | Omega 3 oils[1] | 5.0 | 40 |
|   | Sterols[2] | 6.5 | 52 |

[1] EPA:DHA 150:500 per gram of oil
[2] Sterol esters and free sterol oils ~97 wt. %

Example 4

TABLE 4

Fortified Jelly Containing 13 wt. % Sterol Esters

| Order of Addition | Ingredient | Wt. % | Wt. in grams |
|---|---|---|---|
| A | Water | 24.82 | 198.59 |
|   | Sodium Citrate Dihydrate | 0.33 | 2.65 |
|   | Citric Acid, monohydrate | 0.41 | 3.31 |
| B | Gelling Pectin | 0.99 | 7.94 |
|   | Emulsifying Pectin | 0.66 | 5.30 |
|   | Sugar | 4.14 | 33.10 |
| C | Sugar | 37.65 | 301.20 |
|   | High Fructose Corn Syrup 42 DE | 24.82 | 198.59 |
| D | Citric Acid, 50% w/w | 0.83 | 6.62 |
|   | Flavor | 0.83 | 6.62 |
|   | Color | 0.04 | .33 |
| E | Sterol Esters[1] | 13.0 | 104 |

[1] Sterol esters and free sterol oils ~97 wt. %

Example 5

TABLE 5

Fortified Jelly Containing 5 wt. % Sterol Esters

| Order of Addition | Ingredient | Wt. % | Wt. in grams |
|---|---|---|---|
| A | Water | 24.82 | 198.59 |
|   | Sodium Citrate Dihydrate | 0.33 | 2.65 |
|   | Citric Acid, monohydrate | 0.41 | 3.31 |
| B | Gelling Pectin | .99 | 7.94 |
|   | Emulsifying Pectin | .66 | 5.30 |
|   | Sugar | 4.14 | 33.10 |
| C | Sugar | 37.65 | 301.20 |
|   | Sorbitol | 4.47 | 35.75 |
|   | High Fructose Corn Syrup 42 DE | 24.82 | 198.59 |
| D | Citric Acid, 50% w/w | 0.83 | 6.62 |
|   | Flavor | 0.83 | 6.62 |
|   | Color | 0.04 | 0.33 |
| E | Omega-3-oils[1] | 5.0 | 40 |

[1] EPA:DHA 150:500 per gram of oil

Process/Procedure for Examples 1-5.
1. Water (A) was added to dissolve the citric acid (A) and sodium citrate (A).
2. Pectin was dry blended with sweetener (B) in order to avoid formation of pectin lumps which are difficult to dissolve. The water in the beaker was added while stirring.
3. The mixture was heated slowly in a hot water bath, simmered for about 5 minutes to ensure solvation of the pectin.
4. Ingredients (C) were heat until liquid and sweetners dissolved. Ingredients (C) added to pectin beaker.
5. Mixture brought to a boil and heated to about 80 wt. % solid.
6. Ingestible hydrophobic active (E) and homogenized off heat.
7. Beaker returned to heat and brought back to a boil for about 5 minutes.
8. (D) components, citric acid, flavors and colorants added.

Flavor of samples was excellent, no conjugated linoleic acid overtones or unpleasant fishy taste.

Example 6. Sugar Free Fortified Jelly Containing Sterol Esters

| Order of Addition | Ingredient | Wt. % | Wt. in grams |
|---|---|---|---|
| A | Water | 24.80 | 198.40 |
|   | Sodium citrate Dihydrate | 0.33 | 2.65 |
|   | Citric Acid, monohydrate | 0.41 | 3.31 |
| B | Gelling Pectin | 0.99 | 7.94 |
|   | Emulsifying Pectin | 0.66 | 5.29 |
|   | Xylitol | 4.13 | 33.07 |
| C | Polydextrose Syrup | 37.6 | 300.90 |
|   | Xylitol | 24.80 | 198.40 |
|   | Sorbitol | 4.46 | 35.71 |
| D | Stevia | 0.05 | 0.40 |
|   | Acesulfame K | 0.05 | 0.40 |
|   | Citric Acid, 50% w/w | 0.83 | 6.61 |
|   | Flavor | 0.83 | 6.61 |
|   | Color | 0.83 | 6.61 |
| E | Sterol Esters[1] | 11 | 104 |

[1] Sterol esters and free sterol oils ~97 wt. %

Example 7—Sugar Free LM Pectin as Gelling Pectin

| Order of Addition | Ingredient | Wt. % | Wt. in grams |
|---|---|---|---|
| A | Water | 22.71 | 181.67 |
|   | Calcium Salt | 0.03 | 0.24 |
| B | Gelling Pectin[1] | 0.91 | 7.27 |
|   | Emulsifying Pectin | 0.61 | 4.84 |
|   | Maltitol Syrup | 3.78 | 30.28 |
| C | Maltitol Syrup | 34.44 | 275.53 |
|   | Sorbitol | 4.09 | 32.70 |
|   | Crystalline Maltitol | 22.71 | 181.67 |
| D | Stevia | 0.05 | 0.36 |
|   | Acesulfame K | 0.05 | 0.36 |
|   | Citric Acid, 50% w/w | 0.76 | 6.06 |
|   | Flavor | 0.83 | 6.62 |
|   | Color | 0.04 | 0.33 |

-continued

| Order of Addition | Ingredient | Wt. % | Wt. in grams |
|---|---|---|---|
| E | Conjugated Linoleic Acid (CLA) | 9.08 | 72.67 |

[1]Gelling Pectin is a LM pectin

Process/Procedure for Examples 6 and 7
1. Water (A) is added to dissolve the citric acid (A) and sodium citrate (A).
2. Pectin is dry blended with sweetener (B) in order to avoid formation of pectin lumps which are difficult to dissolve. The water in the beaker is added while stirring.
3. The mixture is heated slowly in a hot water bath, simmering for about 5 minutes to ensure solvation of the pectin.
4. Ingredients (C) are heated until liquid and sweetners dissolved. Ingredients (C) is added to pectin beaker.
5. Mixture is boiled and heated to about 80 wt. % solid.
6. The ingestible hydrophobic active (E) is homogenized off heat.
7. Beaker is returned to heat and brought back to a boil for about 5 minutes.
8. (D) components, citric acid, flavors and colorants are added.

The invention claimed is:

1. A fortified jellied confectionery product comprising:
a) 4 to 20 wt. % of an ingestible hydrophobic active,
b) at least 25 wt. % or greater of a sweetener,
c) 0.5 to 3 wt. % of an acidifying agent,
d) 0.1 to 2 wt. % of an emulsifying pectin, and
e) a gelling pectin,
wherein the fortified jellied confectionery product having a weight ratio of the ingestible hydrophobic active component a) to the emulsifying pectin component d) of from 5:1 to 35:1,
the weight ratio of emulsifying pectin d) to gelling pectin e) is from 1:1 to 1:4,
the emulsifying pectin d) is beet, potato, apple or pear pectin,
the gelling pectin is a fruit pectin and is different from the emulsifying pectin, and
the wt. % is based on the total weight of the confectionery product.

2. The fortified jellied confectionery product according to claim 1, wherein the emulsifying pectin d) is a beet pectin.

3. The fortified jellied confectionery product according to claim 1, wherein the ingestible hydrophobic active a) is selected from the group consisting of essential fatty acids; omega-3 fatty acids; omega-6 fatty acids; docosahexaenoic acid (DHA); eicosapentaenoic acid (EPA); conjugated linoleic acid (CLA); phytochemicals; phytosterols; stigmasterol, campesterol, and b-sitosterol, and corresponding stanols and esters thereof; coenzymes; Coenzyme Q10; oil soluble vitamins; vitamin A; vitamin E; and vitamin D.

4. The fortified jellied confectionery product according to claim 1, wherein the confectionery product is essentially gelatin free.

5. The fortified jellied confectionery product according to claim 1, wherein the pH of the product ranges from 2.5 to 4.

6. The fortified jellied confectionery product according to claim 1, wherein the sweetener b) is a sugar or sugar substitute and is selected from the group consisting of glucose; fructose; sucrose; maltose; galactose; xylose; dextrose; trehalose; raffinose; stachyose; sorbitol; mannitol; targatose; raftilose; dextrin corn syrups; honey; molasses; malt syrups; corn syrup solids; invert sugar; maltodextrins; acesulfame-K and sodium and calcium salts thereof; saccharin and salts thereof: sodium salt of saccharin; dipeptide sweeteners; aspartame; dihydrochalcone compounds; glycyrrhizin; Stevia rebaudiana (Stevioside); chloro derivatives of sucrose; sucralose; natural intensive sweeteners; Lo Han Kuo; food grade gums; gum Arabic; carboxymethylcellulose (CMC); xanthan; locust bean gum; agar; and mixtures thereof.

7. The fortified jellied confectionery product according to claim 1 comprising the sweetener (b) in a concentration from 30 to 85 wt. % of the total weight of the confectionery product.

8. The fortified jellied confectionery product according to claim 1, wherein the acidifying agent c) is selected from the group consisting of acetic acid, malic acid, lemon juice, citric acid, tartaric acid, ascorbic acid, fumaric acid, and glucono-delta-lactone, and salts thereof.

9. The fortified jellied confectionery product according to claim 1, wherein the ingestible hydrophobic active a) includes conjugated linoleic acid.

10. The fortified jellied confectionery product according to claim 1, wherein the ingestible hydrophobic active a) includes omega-3 fatty acids, omega-6 fatty acids, docosahexaenoic acid (DHA), eicosapentaenoic acid (EPA) and/or phytosterols.

11. The fortified jellied confectionery product according to claim 1 comprising the sweetener b) in a concentration from 40 to 80 wt. % of the total weight of the confectionery product.

12. A method of fortifying the jelly confectionery product according to claim 1, the method comprising combining a) the ingestible hydrophobic active; b) the sweetener; c) acidifying agent; d) the emulsifying pectin and e) the gelling pectin.

13. The fortified jellied confectionery product according to claim 1, wherein the fortified jellied confectionery product comprises 5 to 20 wt. % of the ingestible hydrophobic active.

14. The fortified jellied confectionery product according to claim 1, wherein the fortified jellied confectionery product comprises 6 to 20 wt. % of the ingestible hydrophobic active.

15. The fortified jellied confectionery product according to claim 1, wherein the weight ratio of the ingestible hydrophobic active component a) to the emulsifying pectin component d) is from 6:1 to 25:1.

16. The fortified jellied confectionery product according to claim 1, wherein the weight ratio of emulsifying pectin d) to gelling pectin e) is from 1:1.2 to 1:3.5.

* * * * *

UNITED STATES PATENT AND TRADEMARK OFFICE
CERTIFICATE OF CORRECTION

PATENT NO. : 10,874,116 B2
APPLICATION NO. : 15/570184
DATED : December 29, 2020
INVENTOR(S) : Natasha Noel Chamberlin It is certified that error appears in the above-identified patent and that said Letters Patent is hereby corrected as shown below:

On the Title Page

At (73) Assignee: please change "BASF SE" to --BASF Corporation--.

Signed and Sealed this
Seventh Day of February, 2023

Katherine Kelly Vidal
Director of the United States Patent and Trademark Office